United States Patent
Peruga Nasarre et al.

(10) Patent No.: US 12,294,983 B2
(45) Date of Patent: May 6, 2025

(54) SPECTRAL SHAPING FOR WIRELESS COMMUNICATIONS

(71) Applicant: Nokia Technologies Oy, Espoo (FI)

(72) Inventors: Ismael Peruga Nasarre, Oulu (FI); Kari Pekka Pajukoski, Oulu (FI); Esa Tapani Tiirola, Oulu (FI); Juha Yli-Kaakinen, Tampere (FI); Mikko Valkama, Nokia (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/979,271

(22) Filed: Dec. 12, 2024

(65) Prior Publication Data
US 2025/0113344 A1    Apr. 3, 2025

Related U.S. Application Data

(63) Continuation of application No. 18/686,219, filed as application No. PCT/EP2021/073757 on Aug. 27, 2021.

(51) Int. Cl.
*H04W 72/0453*    (2023.01)
*H04W 72/20*    (2023.01)

(52) U.S. Cl.
CPC ....... *H04W 72/0453* (2013.01); *H04W 72/20* (2023.01)

(58) Field of Classification Search
CPC ........... H04W 16/02–12; H04W 25/03–03993; H04W 72/0453; H04W 72/20; H04W 72/03993
See application file for complete search history.

(56) References Cited

U.S. PATENT DOCUMENTS

| | | |
|---|---|---|
| 8,452,332 B2 | 5/2013 | Yavuz et al. |
| 8,982,984 B2 | 3/2015 | Eliaz |
| 10,404,335 B2 | 9/2019 | Mu |
| 11,095,492 B2 | 8/2021 | Liu et al. |
| 2018/0324005 A1 | 11/2018 | Kim et al. |
| 2019/0280818 A1* | 9/2019 | Renfors ............ H04L 27/26524 |
| 2020/0244501 A1 | 7/2020 | Shattil |
| 2020/0403675 A1 | 12/2020 | Yang et al. |

(Continued)

FOREIGN PATENT DOCUMENTS

| | | |
|---|---|---|
| WO | 2019/029790 A1 | 2/2019 |
| WO | 2021/027901 A1 | 2/2021 |
| WO | 2022/161836 A1 | 8/2022 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

(Continued)

*Primary Examiner* — Thomas R Cairns
(74) *Attorney, Agent, or Firm* — Nokia Technologies Oy

(57) ABSTRACT

An apparatus receiving, from a network node, a configuration message for frequency domain spectral shaping, wherein the configuration message is indicative of at least one or more filter parameters; determining a frequency domain window function according to the one or more filter parameters; and transmitting an uplink transmission applying the determined frequency domain window function.

11 Claims, 10 Drawing Sheets

(56) References Cited

U.S. PATENT DOCUMENTS

2021/0029551 A1    1/2021    Kazmi et al.
2021/0167998 A1    6/2021    Baldemair et al.

OTHER PUBLICATIONS

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.1.0, Mar. 2021, pp. 1-513.

"3rd Generation Partnership Project, Technical Specification Group Radio Access Network; NR; User Equipment (UE) radio transmission and reception; Part 2: Range 2 Standalone (Release 15)", 3GPP TS 38.101-2, V15.3.0, Sep. 2018, pp. 1-106.

"New SID: Optimizations of pi/2 BPSK uplink power in NR", 3GPP TSG RAN Meeting #91e, RP-210910, Agenda: 9.1.5, Huawei, Mar. 22-26, 2021, 4 pages.

"New SID on NR coverage enhancement", 3GPP TSG RAN Meeting #86, RP-193240, Agenda: 9.1.1, China Telecom, Dec. 9-12, 2019, 4 pages.

"On spectrum shaping for uplink Pi/2 BPSK with DFT-S-OFDM", 3GPP TSG-RAN WG1#89, R1-1709002, Agenda: 7.1.5, Nokia, May 15-19, 2017, 3 pages.

"Further Link Results for p/2 BPSK DFT-S-OFDM Waveform with Spectrum", 3GPP TSG RAN WG4 Meeting #85, R4-1714191, Agenda: 9.4.3.2, IITH, Nov. 27-Dec. 1, 2017, 4 pages.

"Performance evaluation for pi/2 BPSK with FDSS", 3GPP TSG RAN WG1 Meeting #88bis, R1-1705060, Agenda: 8.1.10, Huawei, Apr. 3-7, 2017, 8 pages.

"On the detection performance of pi/2-BPSK DFT-s-OFDM with transparent shaping", 3GPP TSG-RAN WG4 Meeting #84bis, R4-1710213, Agenda: 9.4.3.10, Huawei, Oct. 9-13, 2017, 4 pages.

"DFT-Spread OFDM with Pulse Shaping Filter in Frequency Domain in Evolved UTRA Uplink", 3GPP TSG RAN WG1 #42 on LTE, R1-050702, Agenda: 10.3, NTT DoCoMo, Aug. 29-Sep. 2, 2005, pp. 1-8.

Barry et al., "Digital Communication", Springer Science+Business Media, LLC, Third Edition, vol. 1, 2003, 843 pages.

Khan et al., "Low PAPR Reference Signal Transceiver Design for 3GPP 5G NR Uplink", arXiv, Jul. 12, 2019, 12 pages.

International Search Report and Written Opinion received for corresponding Patent Cooperation Treaty Application No. PCT/EP2021/073757, dated May 27, 2022, 13 pages.

"CR to 38.101 for introduction of MPR reduction", 3GPP TSG-RAN WG4 Meeting #109, R4-2321826, Nokia, Nov. 13-17, 2023, 15 pages.

"Enhancements to reduce MPR/PAR", 3GPP TSG-RAN WG4 Meeting#104-bis-e, R4-2215515, Agenda: 6.23.3, Nokia, Oct. 10-19, 2022, 29 pages.

\* cited by examiner

SPECTRAL SHAPING FOR WIRELESS COMMUNICATIONS

FIELD

Various example embodiments relate to spectral shaping for wireless communications.

BACKGROUND

Spectrum shaping is one of techniques to achieve high spectral efficiency for high bandwidth applications. Spectrum shaping may be implemented in frequency domain and in time domain. For example, a frequency domain spectrum shaping (FDSS) function is applied to data converted into frequency domain. After applying the FDSS function, data is mapped to frequency domain resource elements and converted into time domain.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to a first aspect, there is provided an apparatus comprising means for: receiving, from a network node, a configuration message for frequency domain spectral shaping, wherein the configuration message is indicative of at least one or more filter parameters; determining a frequency domain window function according to the one or more filter parameters; and transmitting an uplink transmission applying the determined frequency domain window function.

According to a second aspect, there is provided an apparatus comprising means for: generating a configuration message for frequency domain spectral shaping, wherein the configuration message is indicative of at least one or more filter parameters; transmitting the configuration message to a user equipment; and receiving transmission from the user equipment, wherein a frequency domain window function determined according to the one or more filter parameters is applied.

According to further aspects, there are provided methods, computer programs and non-transitory computer readable mediums.

DETAILED DESCRIPTION

Figure 1:
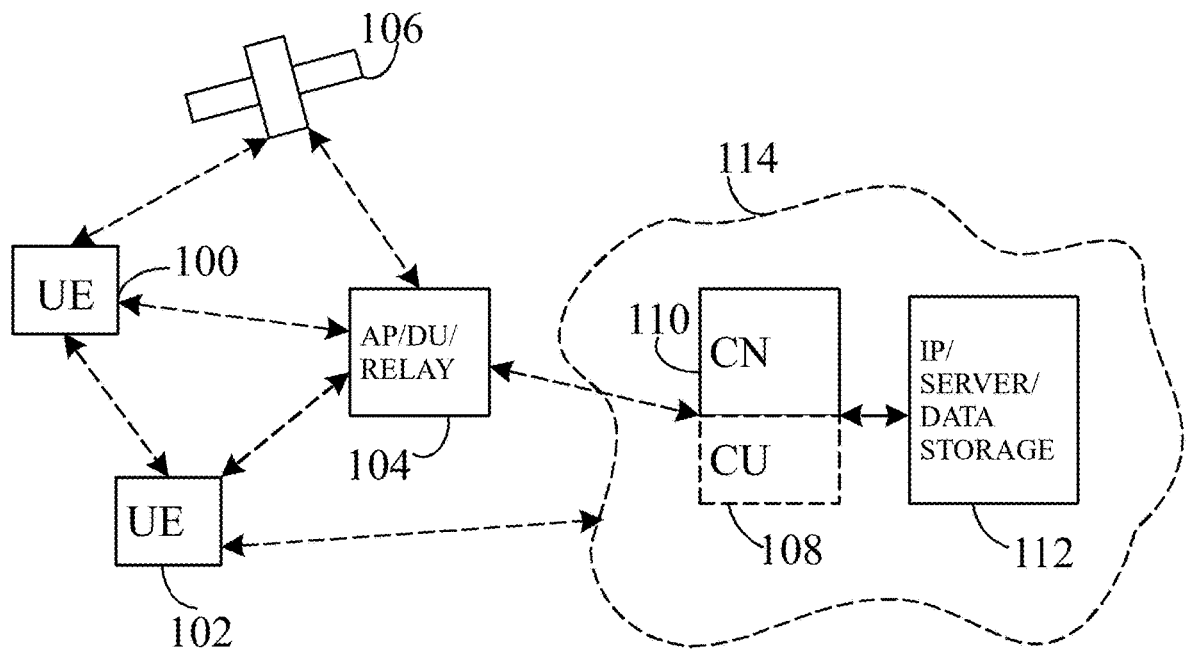
FIG. 1 shows, by way of example, a network architecture of communication system.

FIG. 1 shows, by way of an example, a network architecture of communication system. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The example of FIG. 1 shows a part of an exemplifying radio access network. FIG. 1 shows user devices 100 and 102 configured to be in a wireless connection on one or more communication channels in a cell with an access node, such as gNB, i.e. next generation NodeB, or eNB, i.e. evolved NodeB (eNodeB), 104 providing the cell. The physical link from a user device to the network node is called uplink (UL) or reverse link and the physical link from the network node to the user device is called downlink (DL) or forward link. It should be appreciated that network nodes or their functionalities may be implemented by using any node, host, server or access point etc. entity suitable for such a usage. A communications system typically comprises more than one network node in which case the network nodes may also be configured to communicate with one another over links, wired or wireless, designed for the purpose. These links may be used for signalling purposes. The network node is a computing device configured to control the radio resources of the communication system it is coupled to. The network node may also be referred to as a base station (BS), an access point or any other type of interfacing device including a relay station capable of operating in a wireless environment. The network node includes or is coupled to transceivers. From the transceivers of the network node, a connection is provided to an antenna unit that establishes bi-directional radio links to user devices. The antenna unit may comprise a plurality of antennas or antenna elements. The network node is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. An example of the network node configured to operate as a relay station is integrated access and backhaul node (IAB). The distributed unit (DU) part of the IAB node performs BS functionalities of the IAB node, while the backhaul connection is carried out by the mobile termination (MT) part of the IAB node. UE functionalities may be carried out by IAB MT, and BS functionalities may be carried out by IAB DU. Network architecture may comprise a parent node, i.e. IAB donor, which may have wired connection with the CN, and wireless connection with the IAB MT.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

Additionally, although the apparatuses have been depicted as single entities, different units, processors and/or memory units (not all shown in FIG. 1) may be implemented inside these apparatuses, to enable the functioning thereof.

5G enables using multiple input-multiple output (MIMO) technology at both UE and gNB side, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 7 GHz, cmWave and mmWave, and also being integratable with existing legacy radio access technologies, such as the LTE. Below 7 GHz frequency range may be called as FR1, and above 24 GHz (or more exactly 24-52.6 GHz) as FR2, respectively. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 7 GHz-cmWave, below 7 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). Each satellite 106 in the constellation may cover several satellite-enabled network entities that create on-ground cells. The on-ground cells may be created through an on-ground relay node 104 or by a gNB located on-ground or in a satellite.

Through the development of NR, new frequencies have been made available, including much higher frequencies in FR2, e.g. 28 GHz to 39 GHz, and more spectrum in FR1, e.g. in the band of 3.5 GHz. As a result of using higher frequencies, the signal may suffer higher path loss, with the consequent degradation of the quality of the received signal, which may diminish the network coverage for a reasonable quality of service. Coverage problems may appear also at lower frequencies. For example, 3.5 GHz band is typically used for key mobile services such as voice and low-rate data services. A typical DL/UL ratio for cell traffic is such that only a small fraction of time division duplexing (TDD) time slots can be made available for UL transmissions. This may create coverage problem for various UL channels, especially physical uplink shared channels (PUSCHs).

Peak-to-average-power ratio (PAPR) of a signal waveform is an important metric for UE, since a low PAPR implies that a power amplifier (PA) used to transmit signals operates efficiently thus saving battery in the UE. In other words, low PAPR modulation enables smaller allowed maximum power reduction (MPR) for the UE which enables improved UL coverage. Low PAPR increases the signal-to-noise ratio (SNR) in the receiver.

Frequency-domain spectral shaping (FDSS) building on discrete Fourier transform spread orthogonal frequency-domain multiplexing (DFT-s-OFDM) has shown to have large potential for reducing the PAPR of the signal. When applying FDSS in UL transmitter (Tx), the transition-band bins are weighted by the FDSS function before mapping to the inverse fast Fourier transform (IFFT) input.

Shape of a frequency-domain window function may be defined, for example, using truncated windows. Basic idea of the truncated windows is to modify a response of a known window function by using two parameters: a roll-off factor and a truncation factor. The roll-off defines a shape or slope of the transition band. The truncation factor defines the frequency shift of the transition band towards the allocation center or the allocation edge. Examples of window functions are raised cosine, root raised cosine, Hamming, Hann, and Gaussian.

Figure 2:
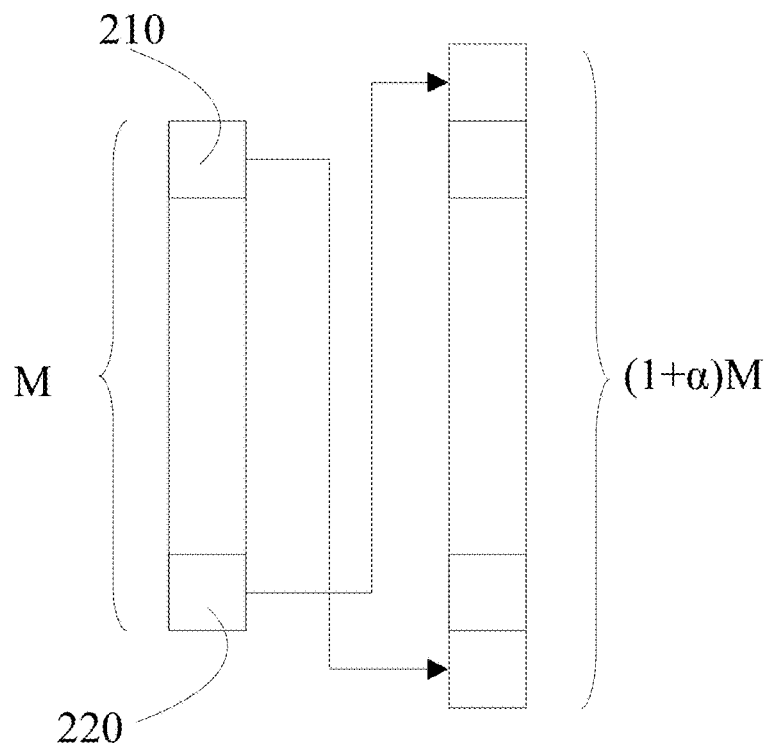
FIG. 2 shows, by way of example, symmetric frequency extension after discrete Fourier transform.

Spectral shaping, or filtering in general, may be applied with or without spectral extension. The extension may be done by means of a symmetric or non-symmetric extension in frequency domain after DFT before windowing. The active subcarriers or a part of them are symmetrically replicated. FIG. 2 shows, by way of example, symmetric frequency extension after DFT. Symmetric extension may be defined by DFT size M and extension factor α, for example. Symmetric extension means that upper end 210 of inband is copied to lower excess band, and lower end 220 of inband is copied to upper excess band. Let us consider shaping a power spectrum of a signal corresponding to an allocation size of 256 physical resource blocks (PRBs). Depending on the extension, the size of the inband allocation would be different. For example, if the extension is 0%, the whole allocation would be assigned to the inband (256 PRBs), if the extension is 12.5%, 224 PRBs would be assigned to the inband and the remaining 32 would be used for the excess band, or if the extension is 25%, 192 PRBs would be assigned to the inband and 64 PRBs would be used for the excess band. The size of the extension has impact on the maximum output power of the transmitter and also on the detection performance of the receiver. One example of a metric to quantify the detection performance is signal-to-noise ratio SNR.

Shaping function without spectral extension is a trade-off between demodulation efficiency and Tx power gain, while shaping function with spectral extension is a trade-off between spectral efficiency and Tx power gain.

When comparing different modulation schemes, such as pi/2 binary phase shift keying (BPSK) and quadrature phase shift keying (QPKS) with and without FDSS, and with and without spectral extension, it can be seen that PAPR can be reduced applying FDSS. For QPKS, PAPR is even further reduced when applying FDSS with spectral extension. FDSS is also shown to have positive effect on the output power, or output back-off (OBO) needed after the PA. FDSS also affects receiver sensitivity. FDSS may create degradation in the receiver sensitivity, and the amount of degradation varies according to scenario and receiver algorithms. In order to achieve net gain, such as coverage gain, the OBO gain is to be greater than receiver (Rx) sensitivity loss. If excess band is used, i.e. spectral extension is greater than 0%, the receiver may potentially use the redundant information of the excess band to reduce the Rx sensitivity loss.

Optimum FDSS or filtering function depends on various factors such as modulation and coding scheme (MCS), PRB allocation, and propagation conditions. When defining FDSS or filtering to be used by the UE in transmission, following may be considered when evaluating the performance of the FDSS or filtering: the output power level that the UE is capable of providing after the power amplifier (PA) while meeting all the UE RF requirements (such as error vector magnitude (EVM), in-band emissions (IBE), occupied bandwidth (OBW), and adjacent channel leakage ratio (ACLR)), and the detection performance of the receiver. When the filter parameters defining the characteristics of the filter, e.g. shape of the frequency-domain window, are known by the receiver, the detection performance of the receiver may be improved. For example, channel estimation performed by the network node may be improved.

There is provided a method and apparatus performing the method for enabling the network node to inform UE which filter parameters the UE will use for its transmissions. FDSS or filtering is controlled in order to guarantee good system performance in various conditions and to improve the detection performance of the receiver.

Figure 3:
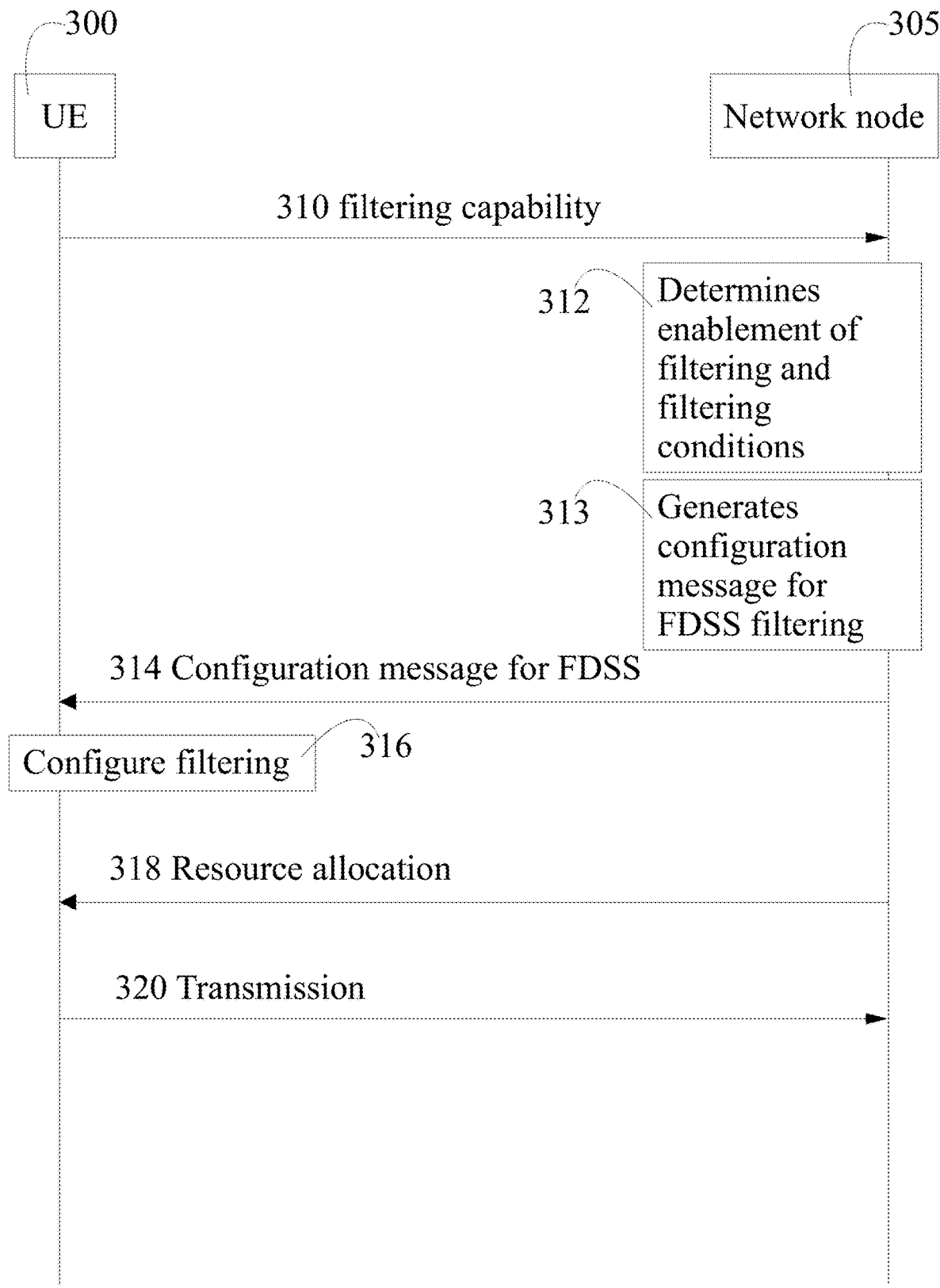
FIG. 3 shows, by way of example, a signalling between entities.

FIG. 3 shows, by way of example, signalling between a user equipment, UE 300, and a network node 305, e.g. gNB. The UE 300 may indicate 310 its filtering capabilities to the gNB. The filtering capabilities may comprise at least frequency domain spectral shaping filtering capability. The gNB 305 receives an indication of filtering capabilities of the UE and based on this indication, determines 312 enablement of filtering. Alternatively, the gNB may implicitly receive information on filtering capabilities of the UE, e.g. based on the frequency band or radio release. For example, for some frequency bands, the UE must have the filtering capabilities. In addition, the gNB 305 determines 312 filtering conditions, such as whether excess band is used in transmission, whether excess band is used in reception, and if excess band is used, the gNB determines the excess band size. Filtering conditions may vary from a scenario to another. For example, in some scenarios, filtering conditions cover only inband. Since the gNB selects the filter to be used by the UE, the UE Tx filtering may be matched with the receiver implementation choices of the gNB. For example, the gNB may know e.g. from filter specific or filter parameter specific MPR requirements, which filter provides the highest Tx power. Then, the gNB may select this kind of filter to be used by the UE, and instruct the UE to use this kind of filter by transmitting corresponding filter parameters to the UE. As another example, the gNB may know in advance which kind of a filter performs optimally from receiver (Rx) point of view, and instruct the UE to use this kind of filter.

The gNB 305 generates 313 a configuration message for frequency domain spectral shaping, FDSS, for transmission 314 to the UE. The configuration message is indicative of at least one or more filter parameters. In addition, the configuration message may be indicative of the filtering conditions defined above. The filter parameters comprise one or more of: filter coefficient(s); parameter pair comprising a roll-off factor and a truncation factor; window type; window type specific filter coefficients; triangular window parameter, impulse response values, EVM equalizer spectral flatness requirements such as maximum peak-to-peak ripple for the different frequency ranges of the allocation to be followed, whether to apply the one or more filter parameters for a) data symbols or b) reference signal symbols and data symbols; etc. The reference signal symbols refer to e.g. demodulation reference signal (DRMS) symbols and/or phase tracking reference signal (PTRS) symbols. For example, the symbols may comprise known PTRS symbols time-division multiplexed with uplink data according to a predefined pattern. PTRS may be used for compensating the phase noise at the receiver.

The configuration message being indicative of at least one or more filter parameters may list the parameters to be used by the UE when designing or determining the filter.

Alternatively, multiple sets of FDSS filter parameters may be predefined in the network specification, e.g. 3GPP specification, for different scenarios, e.g. different modulation and/or coding schemes. The sets of FDSS filter parameters may be preconfigured in both the UE and the network node, and the configuration message may indicate an index to explicitly indicate which set of the FDSS filter parameters the UE should use when determining the filter. One set of filter parameters may be applied at a time. The network node may use media access control (MAC) signalling or radio resource control (RRC) signalling to configure which set of filter parameters the UE should use in different Tx scenarios. For example, the configuration may comprise indicating an index indicating a set of predefined filter parameters which the UE should use. Thus, there may be multiple sets of filter parameters, and the index transmitted along the configuration message may indicate which one of the sets should be used by the UE. For example, the multiple sets of filter parameters may be indicated in network specifications. For example, each set may correspond to a certain index. Thus, when the UE receives the index, it may select the corresponding set of filter parameters accordingly.

As a further alternative, the network specification may define error vector magnitude (EVM) equalizer spectral flatness requirements that apply to the UE transmission. Multiple sets of equalizer spectral flatness requirements may be defined for different scenarios, e.g. different modulation and/or coding schemes. One set of spectral flatness requirements may be applied at a time. The gNB may have selected which requirements the filter to be determined by the UE should fulfill for certain transmission or scenario. For example, a table may be defined in the specifications with equalizer spectral flatness requirements that should be met, and the network node may signal an indication, e.g. an index, on the set of flatness requirements that apply to the given transmission. The network node may use MAC signalling or radio resource control (RRC) signalling to configure which requirements the filter to be determined by the UE should fulfill in different Tx scenarios.

According to a further alternative, the gNB may have defined a range of limits for the UE, such as equalizer spectral flatness requirement, the maximum and minimum slopes of a triangular window to be used. Then, the UE may select a filter that fits in the requirements following a given window shape, e.g. triangular, truncated, or root raised cosine.

The UE configures 316 windowing or filtering, i.e. determines or designs one or more frequency domain window function according to the indications on the one or more filter parameters received from the gNB 305. The UE determines frequency domain window function, or FDSS filter, according to the indications on the one or more filter parameters. For example, the UE may apply the parameters to a predetermined template. Thus, the gNB is aware of what kind of a filter or window function the UE will be using for transmission, which allows to improve the detection performance of the gNB. Additionally, it allows for gNB to optimize the net gain and coverage for different scheduling scenarios taking into account both transmitter performance and receiver performance.

The UE 300 transmits 320 an uplink transmission applying the determined filter, in response to a resource allocation message received 318 from the gNB. Possible excess band allocation may be specified in the resource allocation message(s). Depending on the scenario, resource allocation can be done via RRC (e.g. semi-persistent allocation), via DCI (dynamic downlink control information transmitted via PDCCH)) or via combination of those. The resource allocation may be used to select one out of multiple filtering conditions made available for the current transmission.

The method as disclosed herein enables the network node to assist UE to determine an optimal filter for different scenarios such that the network node is aware of the details of the determined filter. Assistance may be realized by signalling of relatively small number of parameters. Assistance signalling may be dynamic or semi-static.

Different UEs may have different power amplifiers, PAs, for which optimal filter selection is different. To enable optimal filter selection by the network node, both transmission (Tx) and reception (Rx) ends may be taken into account. The network node may be configured to learn which kind of a filter performs optimally for the Tx end, that is, for the UE transmitter. For example, the gNB may, during normal operation, utilizing more than one different filter parameter for the UE, collect UE specific performance statistics according to the filter type or filter shape. As another example, network specification may support triggering of UL signals, such as PUSCH, using predefined filters. For example, learning may be based on PUSCH or reference signal transmitted by the UE with full power, using all available filter shapes one after another. The gNB may then use these transmissions to jointly evaluate performance of transmitter and receiver. For example, maximum power in UE transmission and gNB reception may be evaluated. Transmitted data may be test data or actual data. The gNB may trigger this signalling on the need basis dynamically or semi-statically, e.g. periodically. The gNB may then compare the performance of different filters, and select the filter to be used in the future based on the comparison. For example, the filter that caused the highest SNR or highest Rx power in the receiving end may be selected as the preferred filter. The gNB may also collect performance statistics, such as block error rate (BLER), for different filters.

According to an embodiment, the UE may assist the network node to decide which filter parameters to select for the UE. The UE may know in advance how much MPR different filters require in different scenarios, e.g. for given MCS and PRB allocation. These properties may be specific to UE implementation, and UE may use this information in assisting the network node in filter selection. For example, UE may indicate a preferred filter from a set of predefined filters, e.g. from filters defined in the network specifications. A preferred filter may be selected according to one or more criteria, e.g. a filter with smallest OBO or highest Tx power may be selected. Alternatively, the filters may be ordered according to the one or more criteria, and the UE may indicate a list of filters in priority order. Signalling for this purpose may be e.g. MAC CE. The gNB may then decide the final parameters based on the preferred filter indicated by the UE. As another example, the UE may signal, for example, a difference in decibels between the EVM equalizer spectrum flatness mask for the used filters, evaluated at the edges of the frequency ranges. Assistance by the UE in selection of the final filter parameters provides more information on transmitter performance for the gNB, which is then able to consider both transmitter and receiver performance when making the selection.

The frequency-domain window function or frequency-domain mask used in FDSS-based filtering may be defined by using fixed analytical windows or adjustable windows. Examples of analytical windows are Hamming, Hann, and Bartlett. Examples of adjustable windows are raised cosine, root raised cosine, or ultraspherical windows. Fixed windows are defined by the length or width of the window. Adjustable windows are parametrizable by an additional variable adjusting the shape of the window function, e.g. the roll-off of the window function or the attenuation characteristics.

Figure 4:
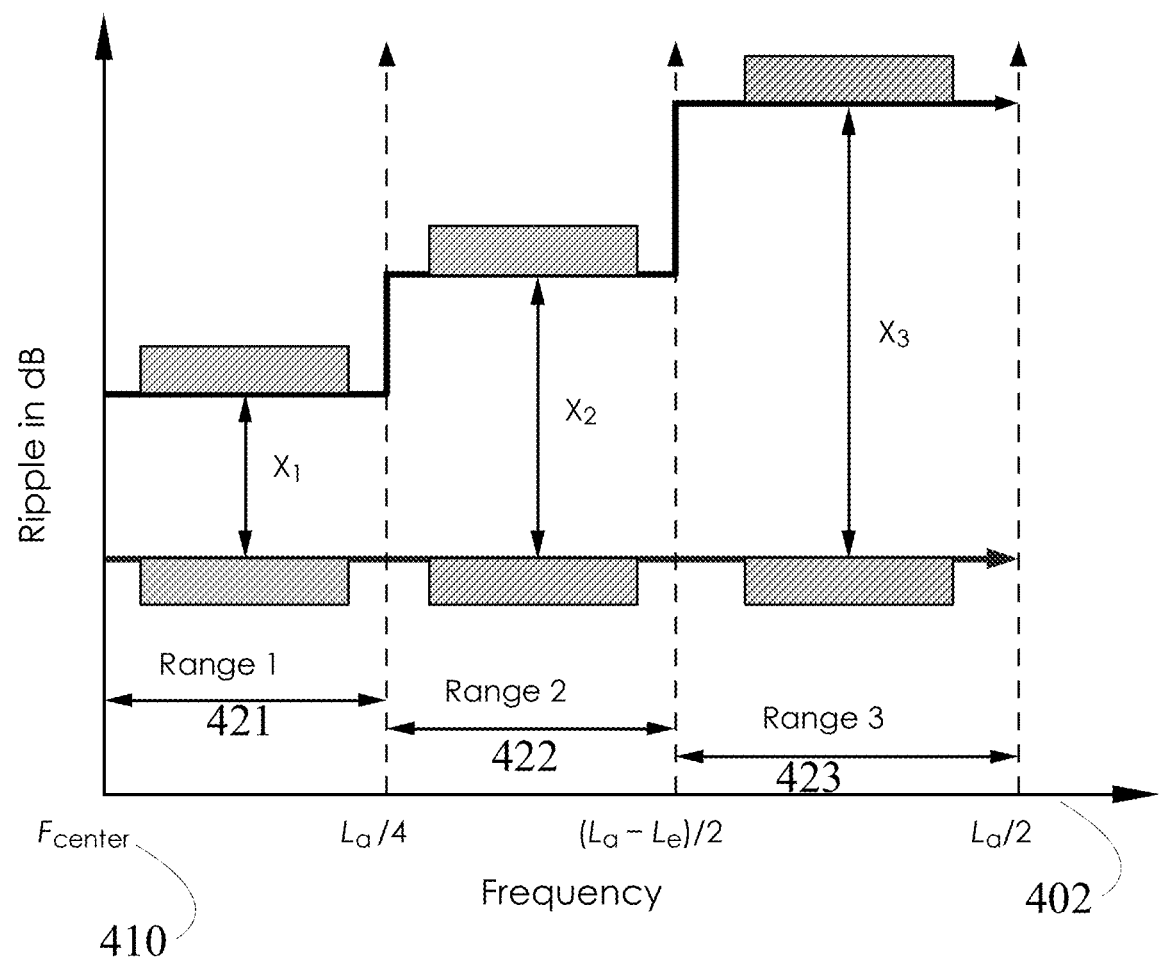
FIG. 4 shows, by way of example, error vector magnitude equalizer flatness requirements for different frequency ranges of the allocation.

Different spectral requirements may be defined separately for different frequency ranges across the allocation. FIG. 4 shows, by way of example, error vector magnitude, EVM, equalizer flatness requirements for different frequency ranges across an allocated uplink block of physical resource blocks. The bandwidth of the allocated uplink block, denoted by $F_{alloc}$, comprises in-band bandwidth, i.e. frequency resources for data transmission, denoted as $F_{data}$, and excess band bandwidth, i.e. frequency resources in the excess band, denoted as $F_{ext}$. The spectral flatness requirements may be used by a transmitting apparatus to optimize its filter configuration. The frequency range definition of FIG. 4 is a three-part frequency definition, depicted starting from a center 410 $F_{center}$ of the bandwidth of the allocated uplink block: there is a first range 421 Range 1, a second range 422 Range 2, and a third range 423 Range 3. The x-axis 402 shows a positive side of frequencies, starting from middle of the center frequency. Similar definitions exist for the lower frequencies symmetrically.

The bandwidth of the allocated uplink block, $F_{alloc}$, is two times the bandwidths illustrated in FIG. 4. The first range 421 is an in-band range from the center frequency of the allocated uplink block to a frequency $L_a/4$ (given in frequency-domain bins), which is one quarter of the allocated uplink block, i.e. $F_{alloc}/4$ in frequency (given in Hertz). The second range 422 is another in-band range, from the frequency $L_a/4$, i.e. $F_{alloc}/4$, to a corresponding end of allocated frequency resources for data transmission, which is $(L_a-L_e)/2$ (given in frequency-domain bins), or $(F_{alloc}-F_{ext})/2$ (given in Hertz). The third range 423 is an excess band range from the end of allocated frequency resources for data transmission to the corresponding end of allocated frequency $L_a/2$ (given in frequency-domain bins), i.e. to $F_{alloc}/2$ (given in Hertz). Using the above, the bandwidth allocated for data transmission is two times the depicted in-band ranges, i.e. $F_{data}=2*$ (range 1+range 2), and the bandwidth of the excess band is twice the depicted excess band range, i.e. $F_{ext}=2*$range 3.

The different spectral flatness requirements, depicted by flatness value ranges $X_k$, namely $X_1$, $X_2$ and $X_3$, may be seen as attenuation limits (attenuation limits of a filter for different frequency ranges inside of the allocation), which limits may be different for different bands. The attenuation limits may be given by parameter values, for example $X_1$ to the first range 421, $X_2$ to the second range 422 and $X_3$ to the third range 423 (excess band range). As can be seen also from FIG. 4, the third range 423 covering the excess band can have less tight spectral flatness requirements due to the fact that the excess band is not primarily carrying the information, but rather a partial copy of some of the in-band subcarriers, for example. Further, in some implementation the excess band may be used by the receiving end of the transmission, which provides further frequency diversity, and allows to collect the signal energy sent via the excess band, and thereby also allows even more less tight spectral flatness requirements.

For DFT-s-OFDM with FDSS and spectral extension, triangular windows has turned out to provide the best PAPR performance for known designs assuming that the extension size is 50 percent of the total allocation and that the window is symmetrical around the half of the allocation bandwidth $((L_a-L_e)/2$ in FIG. 4). The drawback of triangular design may be that the required bandwidth is high and the attenuation characteristics are fixed, which may cause that e.g. the three-range spectral flatness requirements shown in FIG. 4 for providing increased control for pulse shaping cannot be met. Three filter designs are proposed for trading between the required bandwidth and attenuation characteristics while still providing nearly optimal PAPR performance.

For example, type A design may be a truncated triangular window determined to meet the three-range spectral flatness requirements shown in FIG. 4. Let us denote by $L_{data}$ the number of data bearing tones (or frequency-domain bins), $L_a=L_{data}/(1-a)$ and $L_e=\alpha L_a$, respectively, are the allocation size and the spectral extension size in frequency-domain bins. Let us further denote the frequency ranges $\mathcal{N}_1=n\in[0, 1, \ldots, N_1-1]$, $\mathcal{N}_2=n\in[N_1, N_1+1, \ldots, N_2-1]$, and $\mathcal{N}_3=n\in[N_2, N_2+1, \ldots, N_3-1]$, where $N_1=L_a/4$, $N_2=L_{data}/2=(L_a-L_e)/2$, and $N_3=L_a/2$ by range 1, 2, and 3 of FIG. 4. The maximum allowable peak-to-peak ripple in logarithmic scale (decibels) at frequency ranges k is $A_k$ for k=1, 2, 3 while the corresponding ripple in linear scale is given by $$\delta_k = 10^{(-A_k/20)}$$

for k=1,2,3, wherein $A_k \leq X_k$. Now, the width of the triangular window is determined as $$N_\Delta = 2 \times \lfloor \max(N_{\Delta 1}, N_{\Delta 2}, N_{\Delta 3}) \rfloor \quad (1)$$

where
$N_{\Delta 1}=N_1/(1-\delta_1)$, $N_{\Delta 2}=N_2/(1-\delta_2)$, and $N_{\Delta 3}=N_3/(1-\delta_3)$.

For type A design, equation (1) defines the maximum slope, i.e. ratio of height and width, of the truncated triangular window such that the spectral flatness requirements are met for given extension factor, that is, the bandwidth of the allocation is minimized subject to given criteria. This design may give the best spectral containment for given specifications.

Figure 5A:
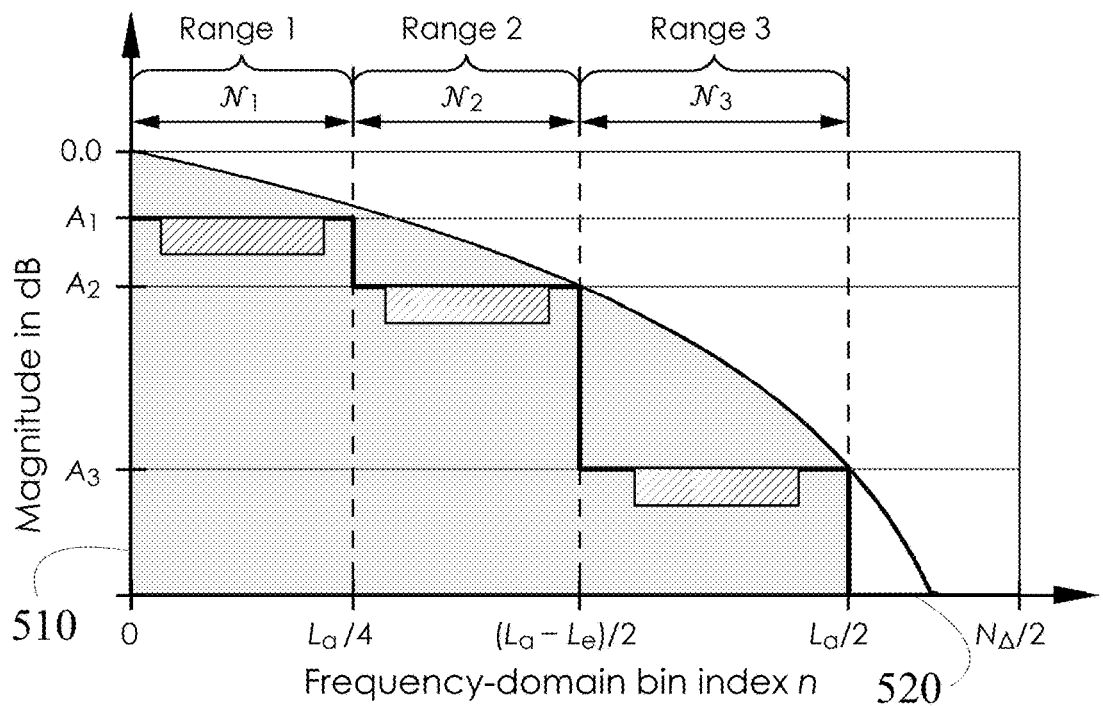
FIG. 5a and FIG. 5b show, by way of examples, truncated triangular frequency-domain window function in logarithmic scale and in linear scale, respectively.
Figure 5B:
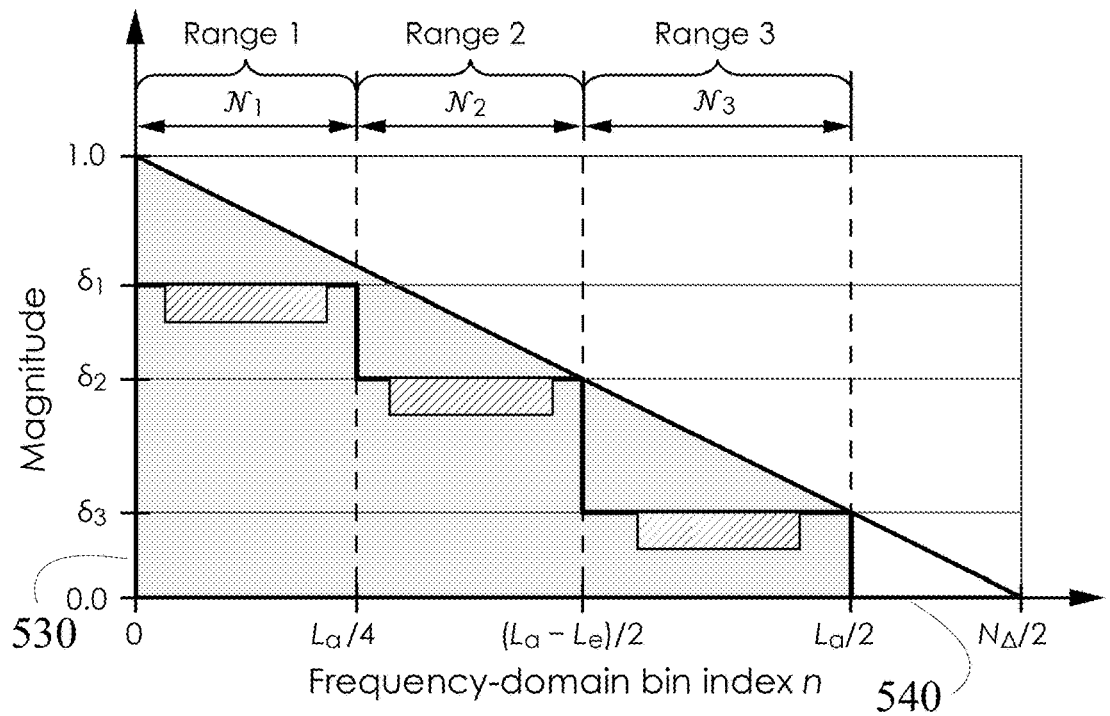

FIGS. 5a and 5b show, by way of examples, truncated triangular frequency-domain window function for DFT-S-OFDM Tx processing with FDSS and spectral extension in logarithmic (decibel) scale and in linear scale, respectively, when $A_x$ is set to be equal to $X_k$. The y-axis 510, 530 shows the attenuation and the x-axis 520, 540 shows the frequency-domain bin index n.

The frequency-domain window function H of the truncated triangular window of length N can now be defined as $$H = [0_{1 \times \lfloor (N-L_a)/2 \rfloor} w^T 0_{1 \times \lceil (N-L_a)/2 \rceil}]^T,$$

where $$[w]_n = 1 - 2 \times |n - \lfloor L_a/2 \rfloor|/(N_\Delta - 1) \text{ for } n \in [0,1, \ldots, L_a-1].$$

Here, N is the inverse transform length in FDSS.

In type A design, it is assumed that the extension factor is given. As another example, type B design may be a truncated triangular window with an extension factor which is as large as possible while still meeting the given EVM equalizer spectral flatness requirements. In this case, the width of the triangular window is first defined as $$N_\Delta = 2 \times \lfloor N_2/(1-\delta_2) \rfloor,$$

while $$N_1 = \lceil 0.5 \times N_\Delta (1-\delta_1) \rceil \text{ and } N_3 = \lceil 0.5 \times N_\Delta (1-\delta_3) \rceil.$$

The total allocation size can now be determined as $$L_a = \min(4N_1, 2N_3),$$

where the extension factor is given as $$\alpha = 1 - L_{data}/L_a.$$

When type B design is used, the UE may signal the extension size to the network node if the spectral extension is to be used for reception.

Figure 6A:
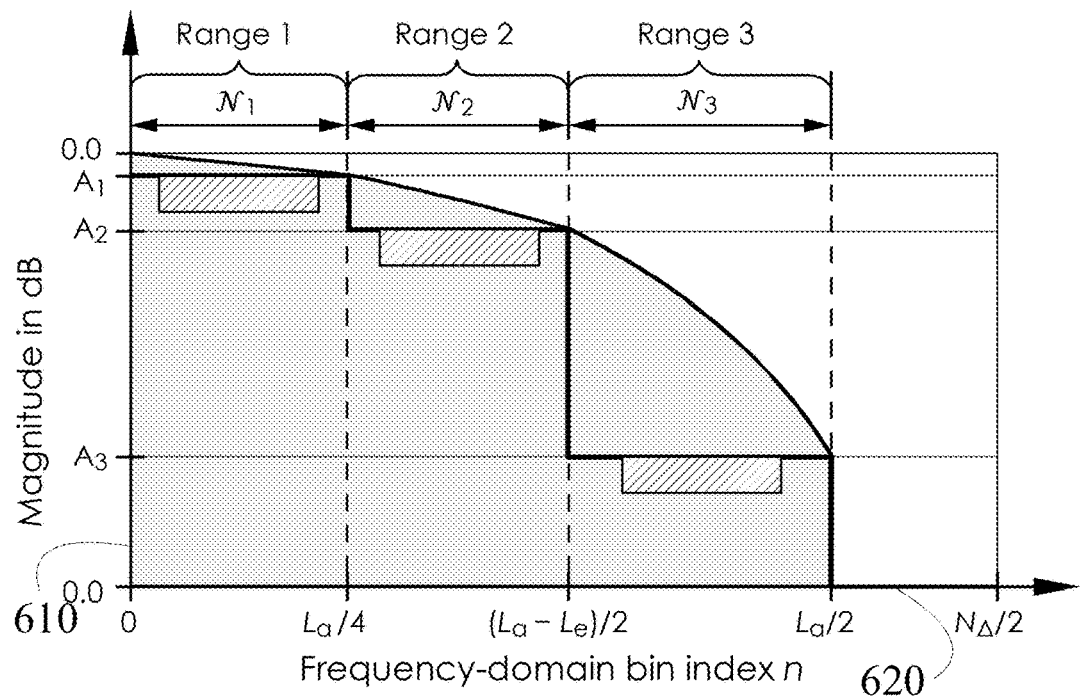
FIG. 6a and FIG. 6b show, by way of examples, piecewise linear frequency-domain window function in logarithmic scale and in linear scale, respectively.
Figure 6B:
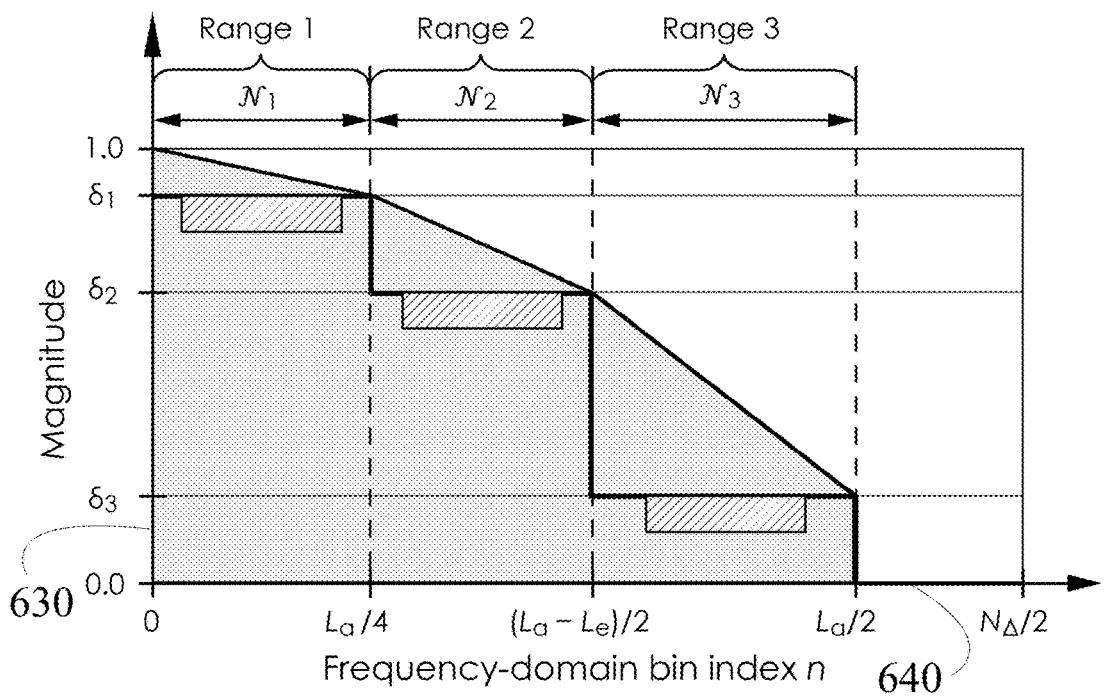

As still a further example, a piece-wise-linear (PWL) design is provided. Here the basic idea is to fit a straight line in linear domain between the corner frequencies as formally defined by frequency-domain window function $$H = [0_{1 \times [(N-L_a)/2]} J w_2^T J w_1^T J w_0^T w_0^T w_1^T w_2^T 0_{1 \times [(N-L_a)/2]}]$$

where $$[w_0]_n = 1 - n(1-\delta_1)/(N_1-1) \text{ for } n \in [0,1,\ldots,N_1-1],$$

$$[w_1]_n = \delta_1 - n(\delta_1-\delta_2)/(N_2-N_1-1) \text{ for } n \in [0,1,\ldots,N_2-N_1-1],$$

$$[w_2]_n = \delta_2 - n(\delta_2-\delta_3)/(N_3-N_2-1) \text{ for } n \in [0,1,\ldots,N_3-N_2-1],$$

and J is the reverse identity matrix. This approach may give the best PAPR for given extension factor. FIGS. 6a and 6b show, by way of examples, PWL frequency-domain window function for DFT-s-OFDM Tx processing with FDSS and spectral extension in logarithmic (decibel) scale and in linear scale, respectively. The y-axis 610, 630 shows the attenuation and the x-axis 620, 640 shows the frequency-domain bin index n.

Figure 7A:
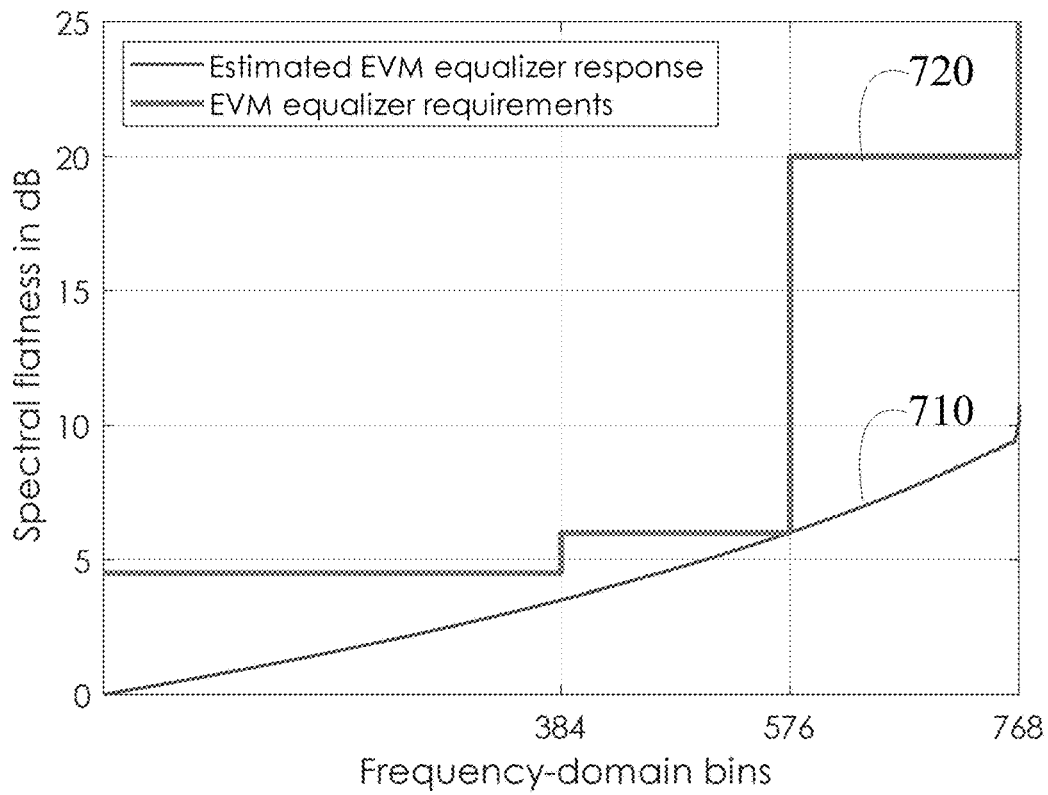
FIG. 7a, FIG. 7b and FIG. 7c show, by way of examples, error vector magnitude equalizer responses and requirements.
Figure 7B:
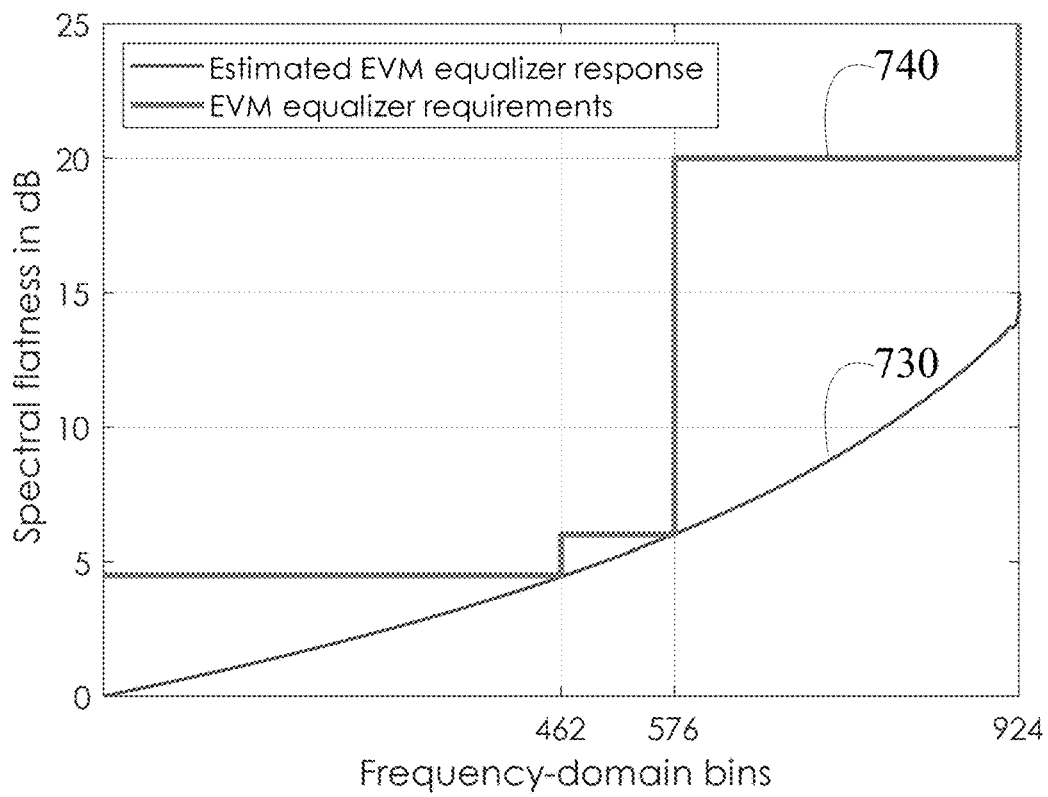
Figure 7C:
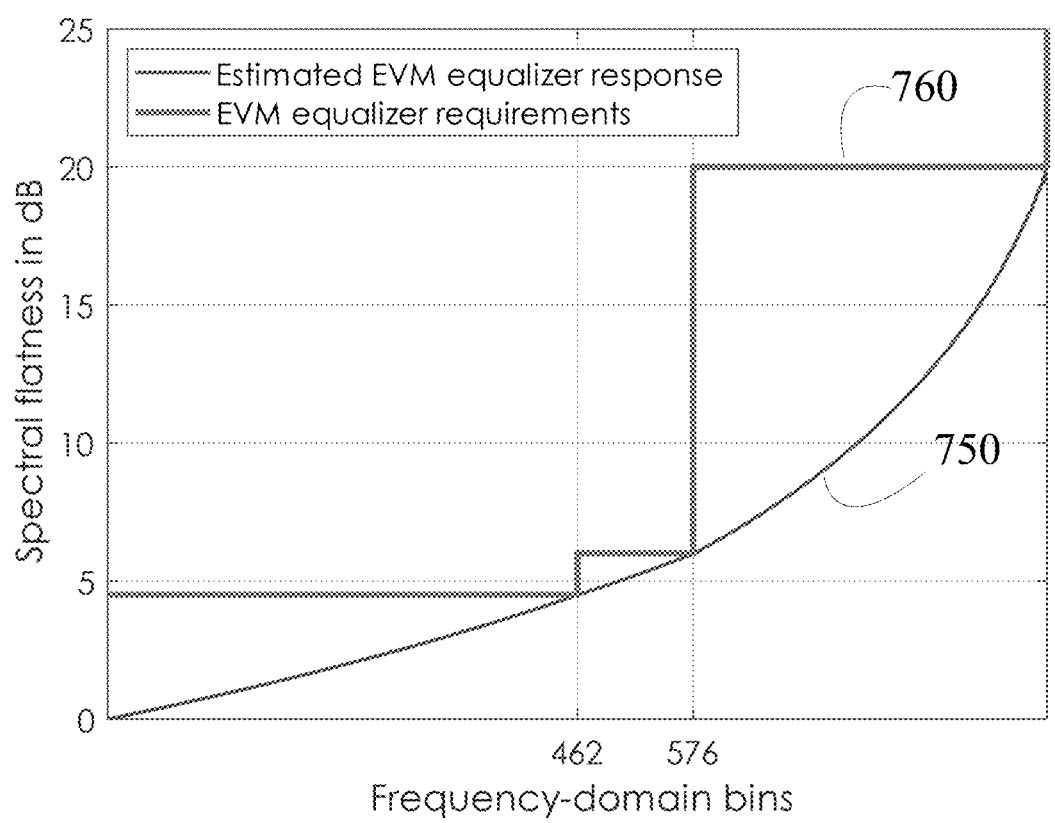

For example, consider 400 MHz 5G-NR FR2 channel with 120 kHz subcarrier spacing (SCS). Let the total allocation size be $L_a=128\times12$ frequency-domain bins (128 PRBs) and the extension factor is $\alpha=0.25$ corresponding to 25% extension. Now the extension size is $L_e=\alpha L_a$ bins (32 PRBs) while $L_{data}=L_a(1-\alpha)$ bins (96 PRBs) are used for data. $N_1=L_a/4=384$, $N_2=(L_a-L_e)/2=576$, and $N_3=L_a/2=768$. The example EVM equalizer spectral flatness requirements are $A_1=4.5$ dB, $A_2=6.0$ dB, and $A_3=20.0$ dB. The maximum width of the triangular window can be determined as $N_A=2308$ bins. FIG. 7a shows the EVM equalizer response 710 for FDSS-based DFT-s-OFDM waveform filtered using the type A design as well as the requirements 720. Assuming that the extension is to be maximized for given window width, then the resulting total allocation and extension sizes are $L_a=154\times12$ (154 PRBs) and $L_e=58\times12$ (58 PRBs), respectively, while the extension factor becomes $\alpha=0.377$ corresponding to 37.7% extension. FIG. 7b shows the EVM equalizer response 730 for the corresponding waveform filtered with type B design as well as the requirements 740. FIG. 7c shows the EVM equalizer response 750 for the corresponding waveform filtered with PWL window design, when the extension factor $\alpha$ is 0.377, as well as the requirements 760.

Figure 8:
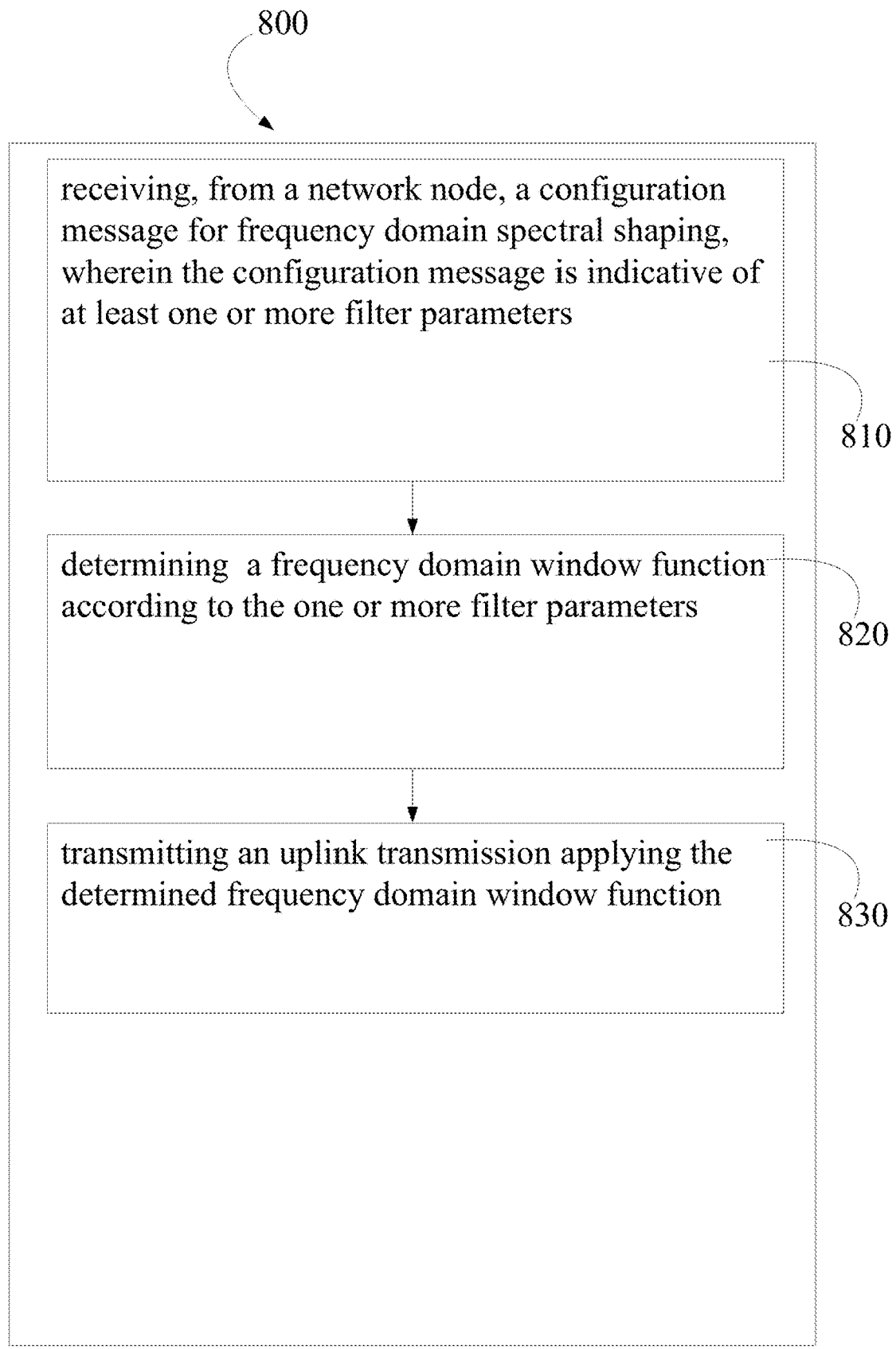
FIG. 8 shows, by way of example, a flowchart of a method.

FIG. 8 shows, by way of example, a flowchart of a method 800. The phases of the method 800 may be performed in an apparatus, such as a UE 100 of FIG. 1 or UE 300 of FIG. 3, comprising means for performing the method, or in a control device configured to control the functioning thereof, when installed therein. The method 800 comprises receiving 810, from a network node, a configuration message for frequency domain spectral shaping, wherein the configuration message is indicative of at least one or more filter parameters. The method 800 comprises determining 820 a frequency domain window function according to the one or more filter parameters. The method 800 comprises transmitting 830 an uplink transmission applying the determined frequency domain window function.

Figure 9:
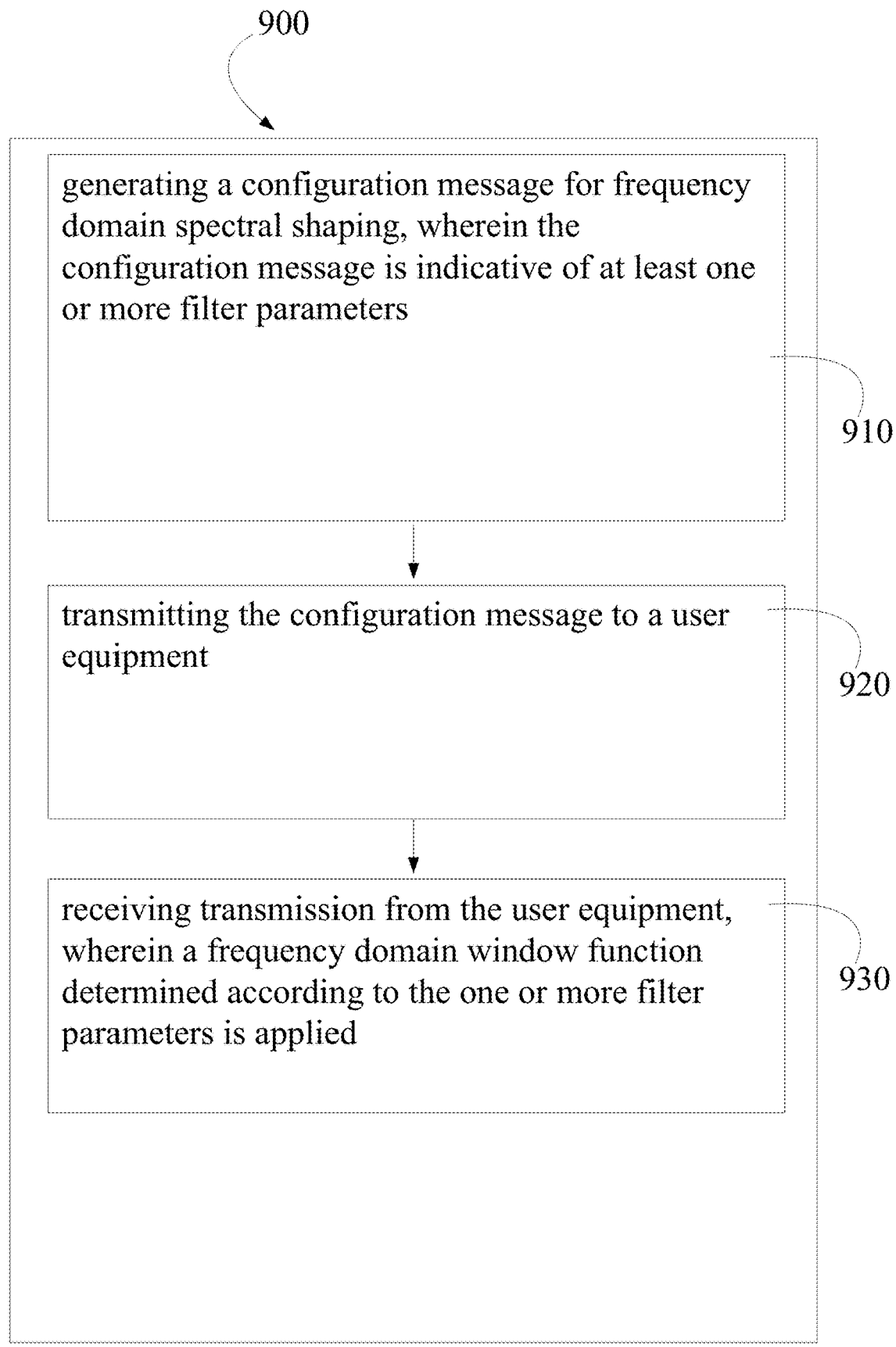
FIG. 9 shows, by way of example, a flowchart of a method.

FIG. 9 shows, by way of example, a flowchart of a method 900. The phases of the method 900 may be performed in an apparatus, such as a network node 104 of FIG. 1 or network node 305 of FIG. 3, comprising means for performing the method, or in a control device configured to control the functioning thereof, when installed therein. The method 900 comprises generating 910 a configuration message for frequency domain spectral shaping, wherein the configuration message is indicative of at least one or more filter parameters. The method 900 comprises transmitting 920 the configuration message to a user equipment. The method 900 comprises receiving 930 transmission from the user equipment, wherein a frequency domain window function determined according to the one or more filter parameters is applied.

The methods as disclosed herein enable the network node to assist UE to determine an optimal filter for different scenarios such that the network node is aware of the details of the determined filter. The methods as disclosed herein enable reduced PAPR and smaller allowed MPR for the UE resulting in improved UL coverage. Since the network node is aware of the details of the determined filter, the detection performance of the network node is improved.

Figure 10:
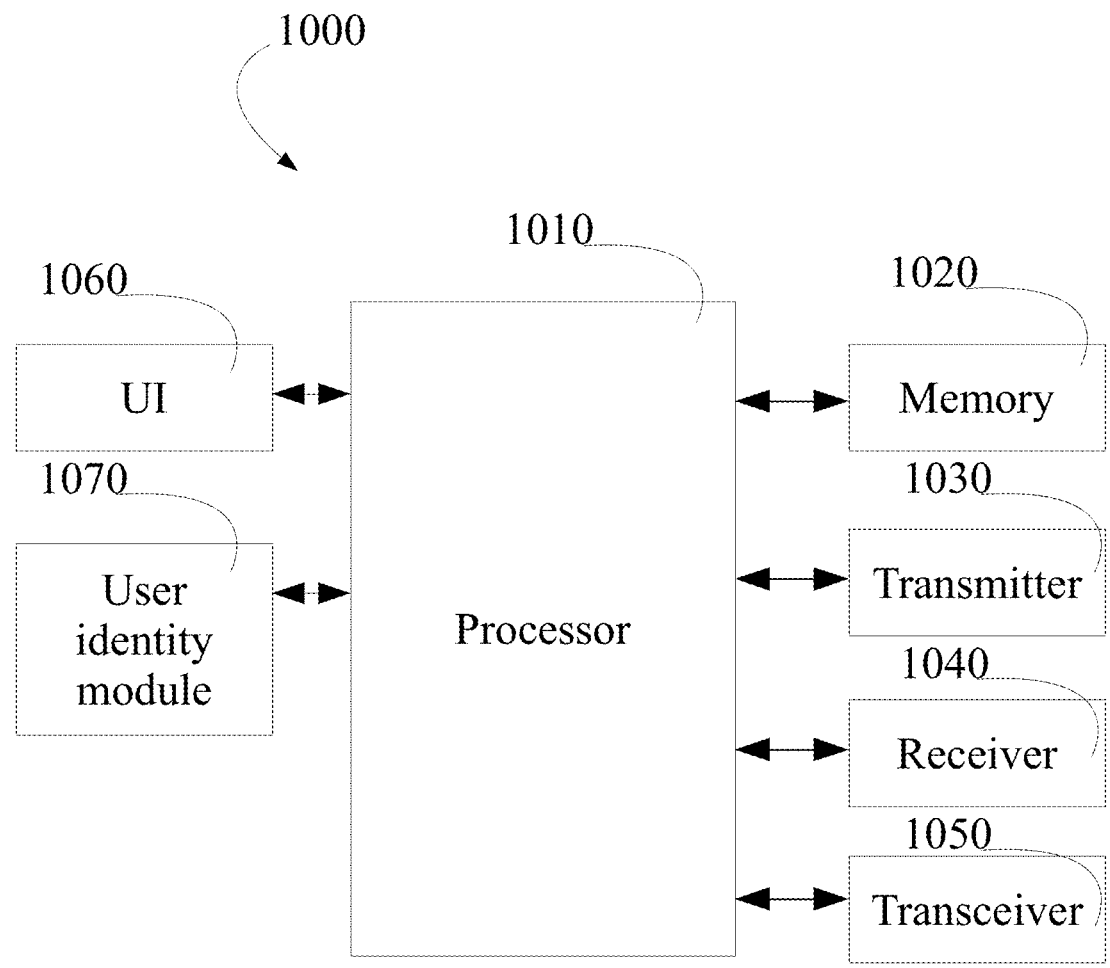
FIG. 10 shows, by way of example, a block diagram of an apparatus.

FIG. 10 shows, by way of example, a block diagram of an apparatus capable of performing the methods as disclosed herein. Illustrated is device 1000, which may comprise, for example, a mobile communication device such as mobile 100 of FIG. 1 or a network node 104 of FIG. 1. Comprised in device 1000 is processor 1010, which may comprise, for example, a single- or multi-core processor wherein a single-core processor comprises one processing core and a multi-core processor comprises more than one processing core. Processor 1010 may comprise, in general, a control device. Processor 1010 may comprise more than one processor. Processor 1010 may be a control device. A processing core may comprise, for example, a Cortex-A8 processing core manufactured by ARM Holdings or a Steamroller processing core designed by Advanced Micro Devices Corporation. Processor 1010 may comprise at least one Qualcomm Snapdragon and/or Intel Atom processor. Processor 1010 may comprise at least one application-specific integrated circuit, ASIC. Processor 1010 may comprise at least one field-programmable gate array, FPGA. Processor 1010 may be means for performing method steps in device 1000. Processor 1010 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 1000 may comprise memory 1020. Memory 1020 may comprise random-access memory and/or permanent memory. Memory 1020 may comprise at least one RAM chip. Memory 1020 may comprise solid-state, magnetic, optical and/or holographic memory, for example. Memory 1020 may be at least in part accessible to processor 1010. Memory 1020 may be at least in part comprised in processor 1010. Memory 1020 may be means for storing information. Memory 1020 may comprise computer instructions that processor 1010 is configured to execute. When computer instructions configured to cause processor 1010 to perform certain actions are stored in memory 1020, and device 1000 overall is configured to run under the direction of processor 1010 using computer instructions from memory 1020, processor 1010 and/or its at least one processing core may be considered to be configured to perform said certain actions. Memory 1020 may be at least in part external to device 1000 but accessible to device 1000.

Device 1000 may comprise a transmitter 1030. Device 1000 may comprise a receiver 1040. Transmitter 1030 and receiver 1040 may be configured to transmit and receive, respectively, information in accordance with at least one cellular or non-cellular standard. Transmitter 1030 may comprise more than one transmitter. Receiver 1040 may comprise more than one receiver. Transmitter 1030 and/or receiver 1040 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 1000 may comprise a near-field communication, NFC, transceiver 1050. NFC transceiver 1050 may support at least one NFC technology, such as NFC, Bluetooth, Wibree or similar technologies.

Device 1000 may comprise user interface, UI, 1060. UI 1060 may comprise at least one of a display, a keyboard, a touchscreen, a vibrator arranged to signal to a user by causing device 1000 to vibrate, a speaker and a microphone. A user may be able to operate device 1000 via UI 1060, for example to accept incoming telephone calls, to originate telephone calls or video calls, to browse the Internet, to manage digital files stored in memory 1020 or on a cloud accessible via transmitter 1030 and receiver 1040, or via NFC transceiver 1050, and/or to play games.

Device 1000 may comprise or be arranged to accept a user identity module 1070. User identity module 1070 may comprise, for example, a subscriber identity module, SIM, card installable in device 1000. A user identity module 1070 may comprise information identifying a subscription of a user of device 1000. A user identity module 1070 may comprise cryptographic information usable to verify the identity of a user of device 1000 and/or to facilitate encryption of communicated information and billing of the user of device 1000 for communication effected via device 1000.

Processor 1010 may be furnished with a transmitter arranged to output information from processor 1010, via electrical leads internal to device 1000, to other devices comprised in device 1000. Such a transmitter may comprise a serial bus transmitter arranged to, for example, output information via at least one electrical lead to memory 1020 for storage therein. Alternatively to a serial bus, the transmitter may comprise a parallel bus transmitter. Likewise processor 1010 may comprise a receiver arranged to receive information in processor 1010, via electrical leads internal to device 1000, from other devices comprised in device 1000. Such a receiver may comprise a serial bus receiver arranged to, for example, receive information via at least one electrical lead from receiver 1040 for processing in processor 1010. Alternatively to a serial bus, the receiver may comprise a parallel bus receiver.

Processor 1010, memory 1020, transmitter 1030, receiver 1040, NFC transceiver 1050, UI 1060 and/or user identity module 1070 may be interconnected by electrical leads internal to device 1000 in a multitude of different ways. For example, each of the aforementioned devices may be separately connected to a master bus internal to device 1000, to allow for the devices to exchange information. However, as the skilled person will appreciate, this is only one example and depending on the embodiment various ways of interconnecting at least two of the aforementioned devices may be selected.

According to an aspect, there is provided an apparatus including a user equipment comprising means for performing: receiving, from a network node, a request for data transmission. The apparatus comprises means for transmitting, in response to the request, a plurality of transmissions with full power filtered by a set of predefined filters one after another. The set of filters may be predefined in network specifications. The apparatus comprises means for receiving, from a network node, a configuration message for frequency domain spectral shaping, wherein the configuration message is indicative of at least one or more filter parameters. The apparatus comprises means for determining a frequency domain window function according to the one or more filter parameters. The apparatus comprises means for transmitting an uplink transmission applying the determined frequency domain window function.

According to a further aspect, there is provided an apparatus including a network node comprising means for transmitting a request for data transmission to a user equipment. The apparatus comprises means for receiving, in response to the request, a plurality of transmissions from the user equipment with full power filtered by a set of predefined filters one after another. The apparatus comprises means for comparing performance of different filters based on the plurality of transmissions. The apparatus comprises means for selecting a filter based on the comparison. The apparatus comprises means for generating a configuration message for frequency domain spectral shaping, wherein the configuration message is indicative of one or more filter parameters corresponding to the selected filter. The apparatus comprises means for transmitting the configuration message to the user equipment. The apparatus comprises means for receiving transmission from the user equipment, wherein a frequency domain window function determined according to the one or more filter parameters is applied.

The invention claimed is:

1. An apparatus comprising:
   at least one processor; and
   at least one memory including computer program code, the at least one memory and the computer program code being configured to, with the at least one processor, cause the apparatus at least to:
   receive, from a network node, a configuration message for frequency domain spectral shaping, wherein the configuration message is indicative of one or more filter parameters, wherein the one or more filter parameters comprise at least error vector magnitude equalizer spectral flatness requirements;
   determine a frequency domain window function according to the one or more filter parameters; and
   transmit an uplink transmission applying the determined frequency domain window function.

2. The apparatus of claim 1, wherein the one or more filter parameters are modulation and coding scheme specific or physical resource block allocation specific.

3. The apparatus of claim 1, wherein the configuration message is further indicative of one or more of
   whether an excess band is available in transmissions from the apparatus;
   whether an excess band is available in receptions by the network node;
   excess band size.

4. The apparatus of claim 1, wherein the one or more filter parameters comprise one or more of:
   filter coefficient(s);
   a roll-off factor and a truncation factor;
   window type;
   window type specific filter coefficients;
   triangular window parameter;
   impulse response values;
   whether to apply the one or more filter parameters for:
      data symbols; or
      reference signal symbols and data symbols.

5. The apparatus of claim 1, wherein the at least one memory and the computer program code are configured to, with the at least one processor, cause the apparatus to:
   transmit an indication of filtering capability to the network node.

6. The apparatus of claim 1, wherein the at least one memory and the computer program code are configured to, with the at least one processor, cause the apparatus to:
   select one or more preferred filters from a set of predefined filters;
   transmit an indication on the one or more preferred filters to the network node; and
   wherein the configuration message received from the network node is indicative of at least one or more filter parameters corresponding to the one or more preferred filters.

7. The apparatus of claim 1, wherein the at least one memory and the computer program code are configured to, with the at least one processor, cause the apparatus to:
   transmit the uplink transmission in response to a resource allocation message received from the network node, wherein the resource allocation message instructs the apparatus to perform the uplink transmission applying the one or more filter parameters.

8. The apparatus of claim 1, wherein the at least one memory and the computer program code are configured to, with the at least one processor, cause the apparatus to:
   transmit, in response to a request from the network node, a plurality of transmissions with full power using a set of predefined filters one after another.

9. The apparatus of claim 1, wherein the configuration message being indicative of at least one or more filter parameters comprises an index indicating a set of predefined filter parameters; and the determining the frequency domain window function according to the one or more filter parameters comprises selecting the set of filter parameters corresponding to the received index.

10. The apparatus of claim 1, wherein the frequency domain window function is at least one of:
    a truncated triangular window function given by frequency domain window function
    $$H=[0_{1\times\lfloor(N-L_a)/2\rfloor}w^T 0_{1\times\lceil(N-L_a)/2\rceil}]^T,$$
    wherein N is inverse transform length,
    $[w]_n = 1 - 2\times|n - \lfloor L_a/2 \rfloor|/(N_A-1)$ for $n \in [0, 1, \ldots, L_a-1]$, wherein a width of the triangular window is $N_A = 2\times \lfloor \max(N_{A1}, N_{A2}, N_{A3}) \rfloor$ where $N_{A1}=N_1/(1-\delta_1)$, $N_{A2}=N_2/(1-\delta_2)$, and $N_{A3}=N_3/(1-\delta_3)$, where $N_1=L_a/4$, $N_2=(L_a-L_e)/2$, and $N_3=L_a/2$, wherein $L_a$ is allocation size and $L_e$ is spectral extension size, and $\delta_k$ is the maximum allowable ripple in linear scale at frequency ranges k=1, 2, 3; or
    a truncated triangular window function given by frequency domain window function
    $$H=[0_{1\times\lfloor(N-L_a)/2\rfloor}w^T 0_{1\times\lceil(N-L_a)/2\rceil}]^T,$$
    wherein N is inverse transform length,
    $[w]n = 1 - 2\times|n - \lfloor L_a/2 \rfloor|/(N_A-1)$ for $n \in [0, 1, \ldots, L_a-1]$, wherein a width of the triangular window is $N_A = 2\times \lfloor N_2/(1-\delta_2) \rfloor$, while $N_1 = \lceil 0.5\times N_A(1-\delta_1) \rceil$ and $N_3 = \lceil 0.5\times N_A(1-\delta_3) \rceil$; or
    a piecewise linear function given by frequency domain window function
    $$H=[0_{1\times\lfloor(N-L_a)/2\rfloor} w_2^T J w_1^T J w_0^T w_0^T w_1^T w_2^T 0_{1\times\lceil(N-L_a)/2\rceil}]^T, \text{ where}$$
    $[w_0]_n = 1 - n(1-\delta_1)/(N_1-1)$ for $n \in [0,1,\ldots,N_1-1]$,
    $[w_1]_n = \delta_1 - n(\delta_1-\delta_2)/(N_2-N_1-1)$ for $n \in [0,1,\ldots, N_2-N_1-1]$,
    $[w_2]_n = \delta_2 - n(\delta_2-\delta_3)/(N_3-N_2-1)$ for $n \in [0,1,\ldots, N_3-N_2-1]$,
    and J is reverse identity matrix, and N is inverse transform length.

11. A method comprising:
    receiving, by a user equipment from a network node, a configuration message for frequency domain spectral shaping, wherein the configuration message is indicative of at least one or more filter parameters, wherein the one or more filter parameters comprise at least error vector magnitude equalizer spectral flatness requirements;
    determining a frequency domain window function according to the one or more filter parameters; and
    transmitting an uplink transmission applying the determined frequency domain window function.

* * * * *